April 22, 1924.

J. CERA

ELECTRODE HOLDER

Filed Feb. 28, 1923

1,491,379

Inventor:
John Cera,
by *Alexander T. Kent*
His Attorney

Patented Apr. 22, 1924.

1,491,379

UNITED STATES PATENT OFFICE.

JOHN CERA, OF PITTSFIELD, MASSACHUSETTS, ASSIGNOR TO GENERAL ELECTRIC COMPANY, A CORPORATION OF NEW YORK.

ELECTRODE HOLDER.

Application filed February 28, 1923. Serial No. 621,925.

*To all whom it may concern:*

Be it known that I, JOHN CERA, a citizen of the United States, residing at Pittsfield, county of Berkshire, State of Massachusetts, have invented certain new and useful Improvements in Electrode Holders, of which the following is a specification.

My invention relates to electrode holders and more particularly to electrode holders for arc welding, wherein the welding arc is maintained between the work and an electrode secured in the holder, the electrode being connected to one terminal of a suitable source of welding current and the work to the other terminal of such source.

An object of my invention is to provide an electrode holder which is short, light and easy to handle, and which is so constructed that the handle remains cool during service.

Electrode holders are customarily provided with a handle of wood or other insulating material and during welding the heat transmitted to the handle makes the handle so hot that it cannot be held comfortably. This necessitates laying the holder aside to permit it to cool and frequently destroys the handle after a few weeks' service. To overcome these objections electrode holders have been proposed in which the handle is secured to the electrode holding means by means including a tube which is provided with ventilating holes placed therein to permit a circulation of air therethrough. In all of such devices with which I am familiar there is a fairly direct heat transmitting path of considerable area between the electrode engaging means and the handle, and to secure an appreciable cooling effect the ventilated tube is necessarily relatively long so that the tool becomes relatively cumbersome and difficult to hold. With continued service, moreover, the deposit which occurs on anything in proximity to a welding arc tends to clog the tube and restrict the circulation of air.

According to my invention the construction is such that the heat transmission is effectively restricted without any increase in the length of the holder and the arrangement is such that there is practically no opportunity for the ventilating passages to become closed.

My invention will be better understood from the following description taken in connection with the accompanying drawing, and its scope will be pointed out in the appended claims.

Figure 1:
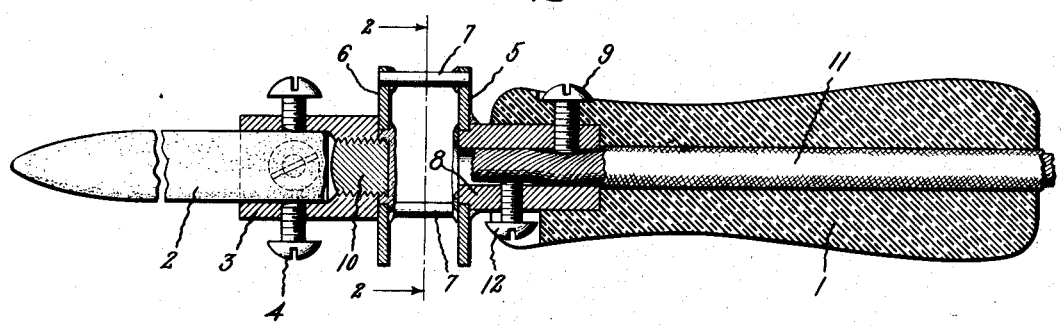
Figure 2:
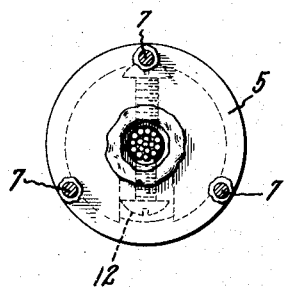

In the drawing, Fig. 1 is a view partly in section showing the construction of my improved electrode holder with an electrode in place therein and with a conductor secured therein for leading current into the electrode holder; Fig. 2 is a view taken on the line 2—2 of Fig. 1, looking in the direction of the arrows.

The electrode holder comprises a handle 1 and means 3 for engaging and holding an electrode 2. The means 3 for engaging and holding the electrode is shown as provided with a socket for holding the electrode in alignment with the handle 1, a plurality of screws 4 being provided for clamping the electrode in the socket. The electrode holding means 3 is secured to the handle 1 by means of an insert, preferably of steel, which comprises a pair of discs 5 and 6 secured together by a plurality of pins 7, three being shown and these pins are preferably welded to the discs 5 and 6 near the periphery thereof. The discs 5 and 6 are thus rigidly secured together and they are preferably spaced apart about half an inch to provide for the circulation of air between the discs. The arrangement of pins near the periphery of the discs does not interfere with the free circulation of air between the discs. A member 8 is secured at the center of disc 5 and is indicated as secured to the disc 5 by being welded thereto. The handle 1 is secured to the member 8 in any suitable manner, the securing means being represented in the drawing as a screw 9 threaded into the member 8. The member 8 preferably projects a short distance into the handle 1 as shown in the drawing. A stud 10 is secured at the center of disc 6 preferably by welding as shown and the holding means 3 for the electrode is shown as threaded upon this stud. The conductor 11 for leading current into the holder is secured to the member 8 in any suitable manner. In the drawing the bared end of the conductor is represented as clamped in a longitudinal opening in the member 8 by means of the screw 12. In the embodiment of my invention illustrated the members 8 and 10 are secured to the discs 5 and 6 in alignment with each other and the conduction of heat from the holding means 3 to the handle 1 is effectively restricted since there is a good circulation of air between the discs 5 and 6 which keep these discs and the connecting pins 7 cool. The arrangement is such that there is no short direct path for the heat to be conducted from the holding means 3 to the handle. The electrode 2 and the holding means 3 therefore become quite hot when the tool is in service but with my improved arrangement I have found that the handle remains sufficiently cool to permit welding to be carried on continuously and since the handle remains quite cool the insulation of which it is composed does not deteriorate by continued use. The ventilating spaces between the discs 5 and 6 are large and there is practically no opportunity for these ventilating passages to become closed by dirt or deposit from the arc.

My improved arrangement makes it possible to keep the handle of the tool cool and yet have the total length of the electrode holder short. I have had perfectly successful results with an electrode holder which is only about 7¼" long.

This makes it possible to make the tool light and easy to handle. The tool can be held between the thumb and fingers like an ordinary pencil, thus giving the operator control of an electrode as sensitively and correctly as one handles a pencil.

While certain features of my invention are not limited to such an arrangement, I preferably arrange the electrode 2 in alignment with the handle 1 so that the arc is at the greatest possible distance from the handle. This lessens the heat which tends to be transmitted by direct radiation from the arc to the hand of the operator and to the handle of the tool.

While I prefer to provide discs 5 and 6 secured together by pins welded thereto and prefer to secure the members 8 and 10 to the discs by electric welding, it will be obvious to those skilled in the art that my invention is not limited to such an arrangement, but embraces any equivalent arrangement, whether the parts are secured together by bolts or rivets, or cast or otherwise formed in one piece. It will be apparent that the discs might be replaced by plates or members not in disc form without departing from the broader aspects of my invention, but the disc members constitute a simple and effective arrangement and make it possible to produce a rigid and well balanced device. Since the discs are relatively thin compared to the members 3 and 8 and present a considerable surface to the air which circulates between the discs, the cooling is very effective.

What I claim as new and desire to secure by Letters Patent of the United States, is:

1. An electrode holder for arc welding comprising a handle, means for holding an electrode and means for securing said handle to said electrode holding means comprising members spaced apart to provide for the circulation of air therebetween and means rigidly connecting said members together arranged to minimize heat transmission from said electrode holding means to the handle and to permit the free circulation of air between said members.

2. An electrode holder for arc welding comprising a handle, means for holding an electrode and means for securing said handle to said electrode holding means comprising a pair of plates spaced apart to provide for the circulation of air therebetween and means for rigidly securing said plates together arranged to restrict the transmission of heat from said electrode holding means to the handle and located to permit the free circulation of air between said plates.

3. An electrode holder for arc welding comprising a handle, means for holding an electrode and means for securing said handle to said electrode holding means comprising a pair of discs spaced apart to provide for the circulation of air therebetween and means for securing said discs together comprising members of small cross section located near the edges of said discs whereby the transmission of heat from the electrode holding means to the handle is restricted and the free circulation of air between said discs permitted.

4. An electrode holder for arc welding comprising a handle, means aligned therewith for holding an electrode and means for securing said handle to said electrode holding means comprising a pair of members secured respectively to said handle and to said holding means and spaced apart to permit a circulation of air therebetween and means for connecting said members together consisting of members of small cross section secured to said spaced members and located out of alignment with said handle and holding means whereby heat transmission from the holding means to the handle is restricted.

5. An electrode holder for arc welding comprising a handle, means for holding an electrode, means for securing said handle to said electrode holding means comprising a pair of metal discs, one of said discs having a projection from the center thereof entering a short distance into one end of said handle and secured thereto and provided with means whereby a conductor may be secured thereto for leading in the welding current, the other disc having a projection from the center thereof to which the electrode holding means is secured and means for rigidly connecting said discs together and holding them in spaced relation comprising a plurality of metal pin-like members secured to said discs near the periphery thereof.

6. An electrode holder comprising a handle, means for engaging and holding an electrode with the axis of the electrode in alignment, with the axis of said handle, and means for securing said electrode holding means to said handle comprising a pair of discs secured respectively to said handle and to said electrode holding means and means for spacing said discs apart and securing them rigidly to each other arranged to permit a free circulation of air between the discs and restrict the transmission of heat from the electrode holding means to the handle.

In witness whereof, I have hereunto set my hand this 26th day of February, 1923.

JOHN CERA.